(12) United States Patent
Suga et al.

(10) Patent No.: US 11,557,439 B2
(45) Date of Patent: *Jan. 17, 2023

(54) MULTI-LAYER CERAMIC ELECTRONIC COMPONENT

(71) Applicant: Taiyo Yuden Co., Ltd., Tokyo (JP)

(72) Inventors: Yasutomo Suga, Tokyo (JP); Masataka Watabe, Tokyo (JP); Takeshi Nakajima, Tokyo (JP); Yuji Tomizawa, Tokyo (JP); Toshiya Kuji, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/237,452

(22) Filed: Apr. 22, 2021

(65) Prior Publication Data

US 2021/0280375 A1    Sep. 9, 2021

Related U.S. Application Data

(63) Continuation of application No. 16/502,666, filed on Jul. 3, 2019, now Pat. No. 11,017,952.

(30) Foreign Application Priority Data

Jul. 17, 2018    (JP) .............................. JP2018-134032

(51) Int. Cl.
*H01G 4/30*    (2006.01)
*H01G 4/012*   (2006.01)
(Continued)

(52) U.S. Cl.
CPC ............... *H01G 4/30* (2013.01); *H01G 4/008* (2013.01); *H01G 4/012* (2013.01); *H01G 4/12* (2013.01); *H01G 4/1218* (2013.01); *H01G 4/228* (2013.01)

(58) Field of Classification Search
CPC ...... H01G 4/008; H01G 4/012; H01G 4/1218; H01G 4/30
See application file for complete search history.

(56) References Cited

U.S. PATENT DOCUMENTS 5,251,094 A    10/1993   Amano et al.
8,319,594 B2   11/2012   Sato et al.
(Continued)

FOREIGN PATENT DOCUMENTS

CN    103903855 A    7/2014
JP    4-352309 A    12/1992
(Continued)

OTHER PUBLICATIONS

Office Action dated Aug. 6, 2020 in U.S. Appl. No. 16/502,666.
(Continued)

*Primary Examiner* — Nathan Milakovich
(74) *Attorney, Agent, or Firm* — Saliwanchik, Lloyd & Eisenschenk

(57) ABSTRACT

A multi-layer ceramic electronic component includes: a ceramic body including first and second main surfaces facing in a first axis direction, first and second end surfaces facing in a second axis direction, and first and second internal electrodes; a first external electrode including a first cover portion covering the first end surface, and a first extended portion extending from the first cover portion to the second main surface; and a second external electrode including a second cover portion covering the second end surface, and a second extended portion extending from the second cover portion to the second main surface, the multi-layer ceramic electronic component satisfying that, when $T_1$ represents a dimension of the ceramic body in the first axis
(Continued)

direction and $T_2$ represents a dimension of each extended portion in the first axis direction, $T_1+T_2$ is 50 μm or less, and $T_2/(T_1+T_2)$ is 0.32 or less.

7 Claims, 5 Drawing Sheets

(51) Int. Cl.
*H01G 4/12* (2006.01)
*H01G 4/228* (2006.01)
*H01G 4/008* (2006.01)

(56) References Cited

U.S. PATENT DOCUMENTS

| | | | |
|---|---|---|---|
| 10,199,170 | B2 | 2/2019 | Sasaki et al. |
| 10,354,801 | B2 | 7/2019 | Watabe et al. |
| 10,395,830 | B2 | 8/2019 | Watabe et al. |
| 11,017,952 | B2 * | 5/2021 | Suga .................. H01G 4/232 |
| 2010/0128411 | A1 | 5/2010 | Onishi et al. |
| 2012/0019981 | A1 | 1/2012 | Yoshida |
| 2014/0185189 | A1 | 7/2014 | Kim et al. |
| 2015/0016018 | A1 | 1/2015 | Onishi et al. |
| 2015/0049412 | A1 | 2/2015 | Kim et al. |
| 2015/0060122 | A1 | 3/2015 | Lee et al. |
| 2015/0380161 | A1 | 12/2015 | Lim et al. |
| 2016/0099108 | A1 | 4/2016 | Koide et al. |
| 2016/0284471 | A1 | 9/2016 | Mizuno et al. |
| 2017/0202090 | A1 | 7/2017 | Lee et al. |
| 2017/0250026 | A1 | 8/2017 | Mizuno |
| 2017/0345572 | A1 | 11/2017 | Sasaki et al. |
| 2018/0218958 | A1 | 8/2018 | Suga et al. |
| 2019/0019624 | A1 | 1/2019 | Oh et al. |
| 2019/0287720 | A1 | 9/2019 | Mori et al. |
| 2020/0082985 | A1 | 3/2020 | Suga et al. |
| 2020/0118755 | A1 | 4/2020 | Yajima et al. |
| 2020/0194184 | A1 | 6/2020 | Nishikawa et al. |
| 2020/0234883 | A1 | 7/2020 | Muramatsu |
| 2020/0234887 | A1 | 7/2020 | Muramatsu |

FOREIGN PATENT DOCUMENTS

| | | |
|---|---|---|
| JP | 2004-146495 A | 5/2004 |
| JP | 2009-4490 A | 1/2009 |
| JP | 2012-94585 A | 5/2012 |
| JP | 2014-130999 A | 7/2014 |
| JP | 2016-9860 A | 1/2016 |
| JP | 2017-152623 A | 8/2017 |
| JP | 2017-216268 A | 12/2017 |

OTHER PUBLICATIONS

Notice of Allowance dated Jan. 25, 2021 in U.S. Appl. No. 16/502,666.
Office Action dated Nov. 22, 2021 in Japanese Application No. 2018-134032.
Office Action dated Jan. 13, 2022 in Chinese Application No. 201910634253.7.
Office Action dated May 17, 2022 in Japanese Application No. 2018-134032.

* cited by examiner

MULTI-LAYER CERAMIC ELECTRONIC COMPONENT

CROSS-REFERENCE TO RELATED APPLICATIONS

This application is a continuation of U.S. application Ser. No. 16/502,666, filed Jul. 3, 2019; which claims the benefit of Japanese Application No. 2018-134032, filed Jul. 17, 2018; which is hereby incorporated by reference in its entirety.

BACKGROUND

The present disclosure relates to a low-profile multi-layer ceramic electronic component.

Along with miniaturization of electronic devices, there are demands for reduction in height of multi-layer ceramic electronic components. Japanese Patent Application Laid-open No. 2014-130999 (hereinafter, referred to as Patent Document 1) discloses a low-profile multi-layer ceramic capacitor. In this multi-layer ceramic capacitor, external electrodes are made thinner, and a ceramic body is made thicker accordingly, thus ensuring strength in a thickness direction.

SUMMARY

However, in a super-thin multi-layer ceramic capacitor in which a ceramic body has a thickness of 50 µm or less, the strength in the thickness direction may be difficult to ensure only by the ceramic body. In other words, in such a multi-layer ceramic capacitor, sufficient strength is difficult to obtain even when the technique of Patent Document 1 is employed.

In view of the circumstances as described above, it is desirable to provide a low-profile multi-layer ceramic electronic component capable of ensuring flexural strength.

According to an embodiment of the present disclosure, there is provided a multi-layer ceramic electronic component including a ceramic body, a first external electrode, and a second external electrode.

The ceramic body includes a first main surface and a second main surface that face in a first axis direction, a first end surface and a second end surface that face in a second axis direction orthogonal to the first axis direction, a first internal electrode that is drawn to the first end surface, and a second internal electrode that faces the first internal electrode and is drawn to the second end surface.

The first external electrode includes a first cover portion that covers the first end surface, and a first extended portion that extends from the first cover portion to the second main surface.

The second external electrode includes a second cover portion that covers the second end surface, and a second extended portion that extends from the second cover portion to the second main surface.

The multi-layer ceramic electronic component satisfies that, when $T_1$ represents a dimension of the ceramic body in the first axis direction, and when $T_2$ represents a dimension of each of the first extended portion and the second extended portion in the first axis direction, $T_1+T_2$ is 50 µm or less, and $T_2/(T_1+T_2)$ is 0.32 or less.

In the multi-layer ceramic electronic component having such a configuration, stress in the second axis direction is applied to the second main surface to which the extended portion is provided, whereas stress is not applied to the first main surface to which the extended portion is not provided. In other words, in the ceramic body, a difference in stress between the first main surface and the second main surface is provided. Thus, since the strength in the first axis direction is improved in the ceramic body, high flexural strength can be obtained.

A dimension of each of the first extended portion and the second extended portion in the second axis direction may be equal to or larger than 25% of a dimension of the ceramic body in the second axis direction.

Each of the first external electrode and the second external electrode may include a sputtering film.

In the multi-layer ceramic electronic component, $T_2/(T_1+T_2)$ may be 0.04 or more. In the multi-layer ceramic electronic component, $T_2$ may be 2 µm or more.

In the configurations described above, an effect of increasing the flexural strength by the extended portions can be more effectively obtained.

It is possible to provide a low-profile multi-layer ceramic electronic component capable of ensuring flexural strength.

These and other objects, features and advantages of the present disclosure will become more apparent in light of the following detailed description of embodiments thereof, as illustrated in the accompanying drawings.

DETAILED DESCRIPTION OF EMBODIMENTS

Hereinafter, an embodiment of the present disclosure will be described with reference to the drawings.

In the figures, an X axis, a Y axis, and a Z axis orthogonal to one another are shown as appropriate. The X axis, the Y axis, and the Z axis are common in all figures.

1. Overall Configuration of Multi-Layer Ceramic Capacitor 10

Figure 1:
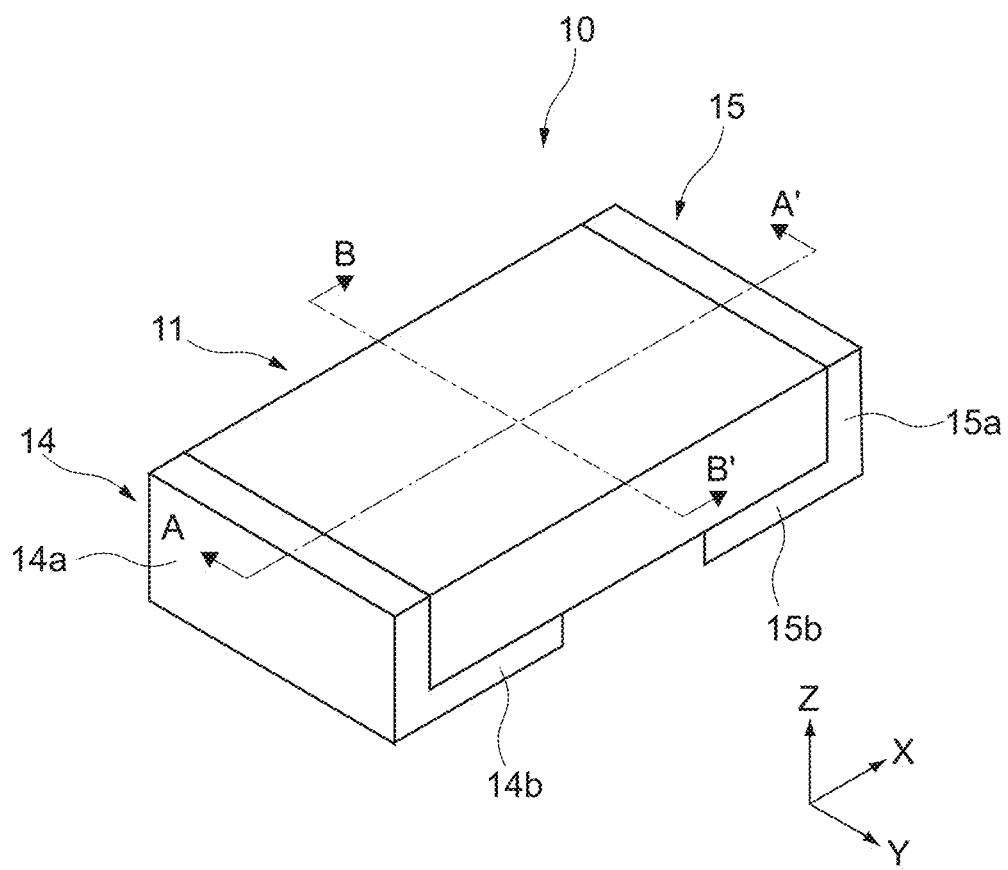
FIG. 1 is a perspective view schematically showing a multi-layer ceramic capacitor according to an embodiment of the present disclosure.
Figure 2:
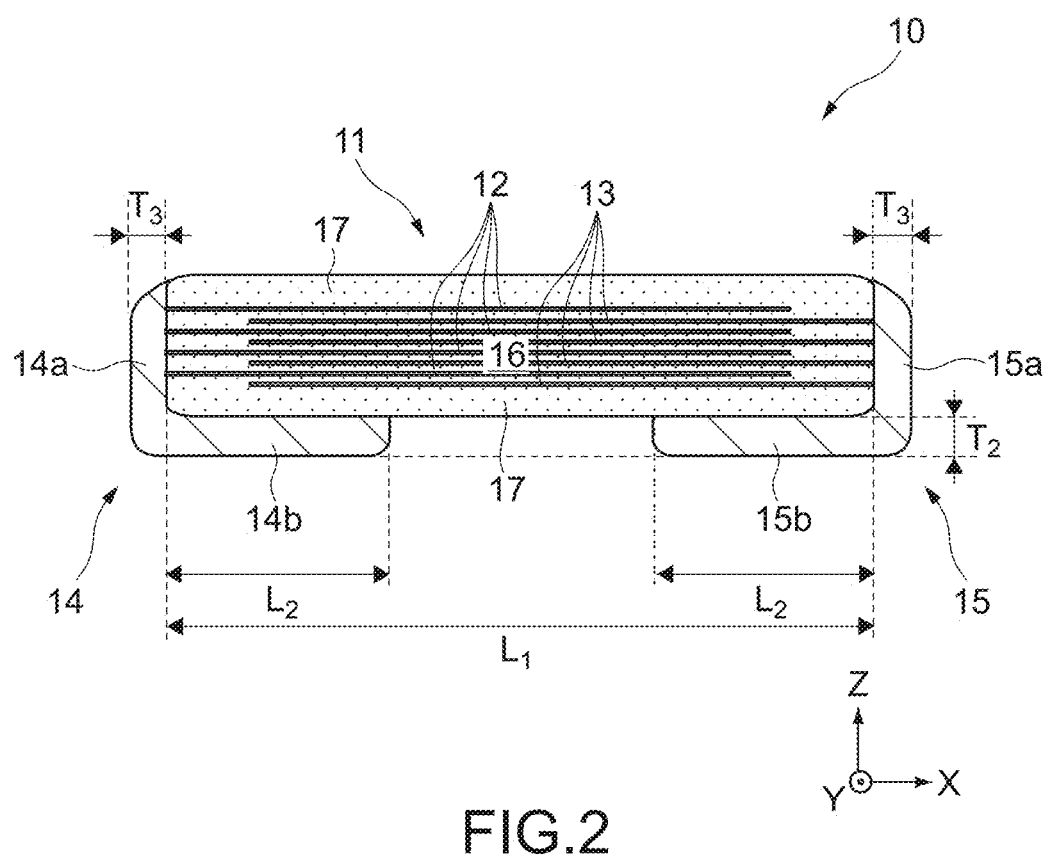
FIG. 2 is a cross-sectional view of the multi-layer ceramic capacitor taken along the A-A' line in FIG. 1.
Figure 3:
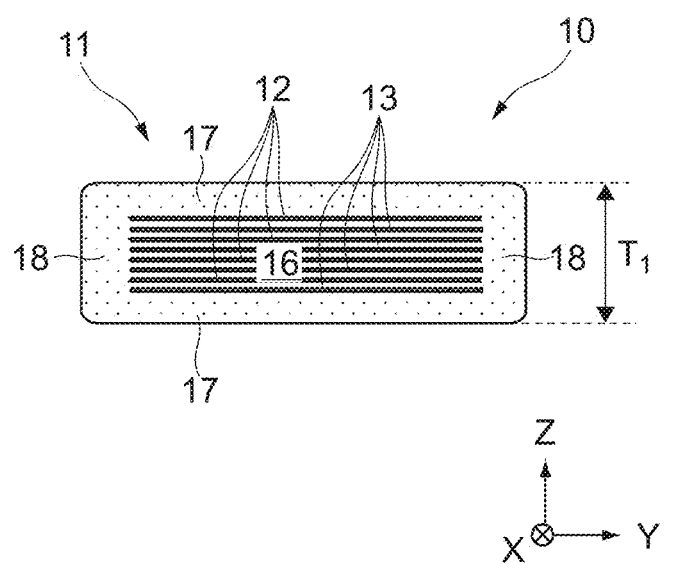
FIG. 3 is a cross-sectional view of the multi-layer ceramic capacitor taken along the B-B' line in FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken along the A-A' line in FIG. 1. FIG. 3 is a cross-sectional view of the multi-layer ceramic capacitor 10 taken along the B-B' line in FIG. 1.

The multi-layer ceramic capacitor 10 is formed to have a low profile. For example, the thickness (dimension in a Z-axis direction) of the multi-layer ceramic capacitor 10 can be set to 50 µm or less. Further, in the multi-layer ceramic capacitor 10, for example, a dimension in a longitudinal direction (X-axis direction) can be set in the range of 0.4 mm to 2.0 mm, and a dimension in a lateral direction (Y-axis direction) can be set in the range of 0.2 mm to 1.0 mm.

More specifically, the size of the multi-layer ceramic capacitor 10 can be set to, for example, 0.4 mm by 0.2 mm by 50 µm, 0.6 mm by 0.3 mm by 50 µm, or 1.0 mm by 0.5 mm by 50 µm. As a matter of course, the multi-layer ceramic capacitor 10 can have various sizes other than the sizes describe above.

The multi-layer ceramic capacitor 10 includes a ceramic body 11, a first external electrode 14, and a second external electrode 15. The ceramic body 11 is formed as a main body of the multi-layer ceramic capacitor 10 and formed to be long in the X-axis direction. Each of the first external electrode 14 and the second external electrode 15 partially covers the surface of the ceramic body 11.

The ceramic body 11 has a hexahedral shape having two end surfaces facing in the X-axis direction, two side surfaces facing in the Y-axis direction, and two main surfaces (hereinafter, also referred to as a first main surface and a second main surface) facing in the Z-axis direction. Note that the ceramic body 11 may not have the hexahedral shape in a precise sense. For example, the surfaces of the ceramic body 11 may be curved surfaces, and the ceramic body 11 may be rounded as a whole.

The first external electrode 14 includes a first cover portion 14a and a first extended portion 14b. The first cover portion 14a covers one of the end surfaces of the ceramic body 11. The first extended portion 14b extends along the X-axis direction from the first cover portion 14a to only the main surface of the ceramic body 11 on the lower side in the Z-axis direction. With this configuration, the first external electrode 14 has an L-shaped cross section parallel to the X-Z plane.

The second external electrode 15 includes a second cover portion 15a and a second extended portion 15b. The second cover portion 15a covers the other end surface of the ceramic body 11. The second extended portion 15b extends along the X-axis direction from the second cover portion 15a to only the main surface of the ceramic body 11 on the lower side in the Z-axis direction. With this configuration, the second external electrode 15 also has an L-shaped cross section parallel to the X-Z plane.

A thickness $T_1$, which is the dimension of the ceramic body 11 in the Z-axis direction, is 45 µm or less. In such a manner, the thickness $T_1$ of the ceramic body 11 is made very small, and thus the thickness of the multi-layer ceramic capacitor 10, which includes the thickness of each of the first and second extended portions 14b and 15b of the first and second external electrodes 14 and 15, respectively, can be set to 50 µm or less.

Meanwhile, when the thickness $T_1$ of the ceramic body 11 is made very small, a ratio (aspect ratio) of the dimension in the longitudinal direction to the thickness $T_1$ in the ceramic body 11 is increased. This reduces flexural strength in the longitudinal direction in the ceramic body 11, and mechanical damage such as a crack becomes prone to occur due to stress in the thickness direction that is applied to the center portion of the ceramic body 11 in the longitudinal direction.

In the ceramic body 11, when the thickness $T_1$ is equal to or smaller than one-fifth of the dimension in the longitudinal direction, mechanical damage is particularly prone to occur. Although it is assumed that the stress in the thickness direction is applied to the ceramic body 11 at various timings, in particular, there is a demand to withstand the stress in the thickness direction that is applied at the time of mounting of the multi-layer ceramic capacitor 10.

In other words, the multi-layer ceramic capacitor 10 is mounted to a substrate by use of a chip mounter that holds the center portion of one of the main surfaces of the ceramic body 11 by suction. At that time, the stress in the thickness direction is applied from the chip mounter to the main surface of the ceramic body 11. With the single ceramic body 11, flexural strength to withstand the stress described above may be difficult to obtain.

In this embodiment, a difference in stress in the X-axis direction is provided between the first main surface of the ceramic body 11 on the upper side in the Z-axis direction and the second main surface of the ceramic body 11 on the lower side in the Z-axis direction. Accordingly, in the ceramic body 11, the stress applied to the first main surface is dispersed in the X-axis direction along the first main surface and the second main surface, and is thus difficult to locally concentrate. This improves the flexural strength.

Specifically, in the multi-layer ceramic capacitor 10, the difference in stress between the first main surface and the second main surface of the ceramic body 11 is provided by the first and second extended portions 14b and 15b of the first and second external electrodes 14 and 15, respectively. In other words, in the ceramic body 11, the first and second extended portions 14b and 15b can apply compression stress or contraction stress to only the second main surface.

In order to apply sufficient stress to the second main surface of the ceramic body 11 from the first and second extended portions 14b and 15b, it is favorable that a dimension $L_2$ of each of the first and second extended portions 14b and 15b in the X-axis direction is set to be equal to or larger than 25% of a dimension $L_1$ of the ceramic body 11 in the X-axis direction. In other words, it is favorable that more than half of the second main surface of the ceramic body 11 is covered with the first and second extended portions 14b and 15b.

The type and magnitude of the stress applied from the first and second extended portions 14b and 15b to the second main surface of the ceramic body 11 are controllable by a method of forming the first and second external electrodes 14 and 15, for example. In this embodiment, when the base films of the first and second external electrodes 14 and 15 are formed by sputtering, the type and magnitude of the stress in the first and second extended portions 14b and 15b becomes controllable.

The thickness that is the dimension of the multi-layer ceramic capacitor 10 in the Z-axis direction can be expressed as a sum $(T_1+T_2)$ of the thickness $T_1$ of the ceramic body 11 and a thickness $T_2$ that is a dimension of each of the first and second extended portions 14b and 15b in the Z-axis direction. In other words, in the multi-layer ceramic capacitor 10, a ratio of the thickness $T_1$, $T_2$ can be determined such that the thickness $(T_1+T_2)$ is 50 µm or less.

In order to apply sufficient stress to the second main surface of the ceramic body 11 by the first and second extended portions 14b and 15b, it is favorable that the thickness $T_2$ of each of the first and second extended portions 14b and 15b is ensured to some extent with respect to the thickness $(T_1+T_2)$ of the multi-layer ceramic capacitor 10. Specifically, in the multi-layer ceramic capacitor 10, $T_2/(T_1+T_2)$ is favorably 0.04 or more.

Further, from a similar perspective, in the multi-layer ceramic capacitor 10, the thickness $T_2$ of each of the first and second extended portions 14b and 15b is favorably 2 µm or more, and more favorably, 4 µm or more. Further, in this case, an effect capable of inhibiting solder erosion in the first and second extended portions 14b and 15b is also obtained at the time of mounting of the multi-layer ceramic capacitor 10.

Meanwhile, when the ratio of the thickness $T_2$ of each of the first and second extended portions 14b and 15b to the thickness $(T_1+T_2)$ of the multi-layer ceramic capacitor 10 is extremely increased, the thickness $T_1$ of the ceramic body 11 becomes extremely small, and the flexural strength of the single ceramic body 11 becomes insufficient. Therefore, the thickness $T_1$ of the ceramic body 11 is necessary to be ensured to some extent.

Specifically, in the multi-layer ceramic capacitor 10, the ratio of the thickness $T_1$, $T_2$ is determined such that $T_2/(T_1+T_2)$ is 0.32 or less. Further, in the multi-layer ceramic capacitor 10, $T_2/(T_1+T_2)$ is favorably 0.3 or less. With this configuration, flexural strength of the multi-layer ceramic capacitor 10 in the longitudinal direction is improved.

In other words, in the multi-layer ceramic capacitor 10, when the ratio of the thickness $T_1$, $T_2$ is set as described above, higher flexural strength is likely to be obtained than in a configuration in which the first extended portion 14b and the second extended portion 15b are not provided or in a configuration in which the first extended portion 14b and the second extended portion 15b are provided to both the main surfaces of the ceramic body 11. Therefore, an effect produced by the first extended portion 14b and the second extended portion 15b can be more effectively obtained.

Note that the thickness $T_2$ of each of the first and second extended portions 14b and 15b may not be made uniform. In this case, the thickness $T_2$ of each of the first and second extended portions 14b and 15b can be defined as the maximum value of the thickness of each of the first and second extended portions 14b and 15b. Further, a thickness $T_3$, which is the dimension of each of the first cover portion 14a and the second cover portion 15a of the first external electrode 14 and the second external electrode 15, respectively, in the X-axis direction may be nearly equal to or different from the thickness $T_2$ of each of the first and second extended portions 14b and 15b.

The first external electrode 14 and the second external electrode 15 are each formed of a good conductor of electricity and function as terminals of the multi-layer ceramic capacitor 10. Examples of the good conductor of electricity forming the first external electrode 14 and the second external electrode 15 include a metal mainly containing nickel (Ni), copper (Cu), palladium (Pd), platinum (Pt), silver (Ag), gold (Au), or the like, and an alloy of those metals.

The first and second external electrodes 14 and 15 are not limited to a specific configuration as long as they have a configuration capable of generating stress. For example, the first and second external electrodes 14 and 15 may have a single-layer structure or multi-layer structure. The first and second external electrodes 14 and 15 of the multi-layer structure may be formed to have a double-layer structure including a base film and a surface film, or a three-layer structure including a base film, an intermediate film, and a surface film, for example.

The base film can mainly contain nickel (Ni), copper (Cu), palladium (Pd), platinum (Pt), silver (Ag), or gold (Au), for example. In this embodiment, the base film is formed by sputtering. However, the base film can also be formed by, for example, spraying other than sputtering.

The intermediate film can mainly contain platinum (Pt), palladium (Pd), gold (Au), copper (Cu), or nickel (Ni), for example. The surface film can mainly contain copper (Cu), tin (Sn), palladium (Pd), gold (Au), or zinc (Zn), for example. The intermediate film and the surface film can be formed by electrolytic plating, for example.

The ceramic body 11 includes a capacitance forming unit 16, covers 17, and side margins 18. The capacitance forming unit 16 is disposed at the center portion of the ceramic body 11 in the Y- and Z-axis directions. The covers 17 cover the capacitance forming unit 16 from the Z-axis direction, and the side margins 18 cover the capacitance forming unit 16 from the Y-axis direction.

More specifically, the covers 17 are disposed on both sides of the capacitance forming unit 16 in the Z-axis direction. The side margins 18 are disposed on both sides of the capacitance forming unit 16 in the Y-axis direction. The covers 17 and the side margins 18 have main functions of protecting the capacitance forming unit 16 and ensuring insulation properties of the periphery of the capacitance forming unit 16.

The capacitance forming unit 16 includes a plurality of first internal electrodes 12 and a plurality of second internal electrodes 13. The first internal electrodes 12 and the second internal electrodes 13 each have a sheet-like shape extending along the X-Y plane and are alternately disposed along the Z-axis direction. The first internal electrodes 12 and the second internal electrodes 13 face each other in the Z-axis direction in the capacitance forming unit 16.

Figure 4:
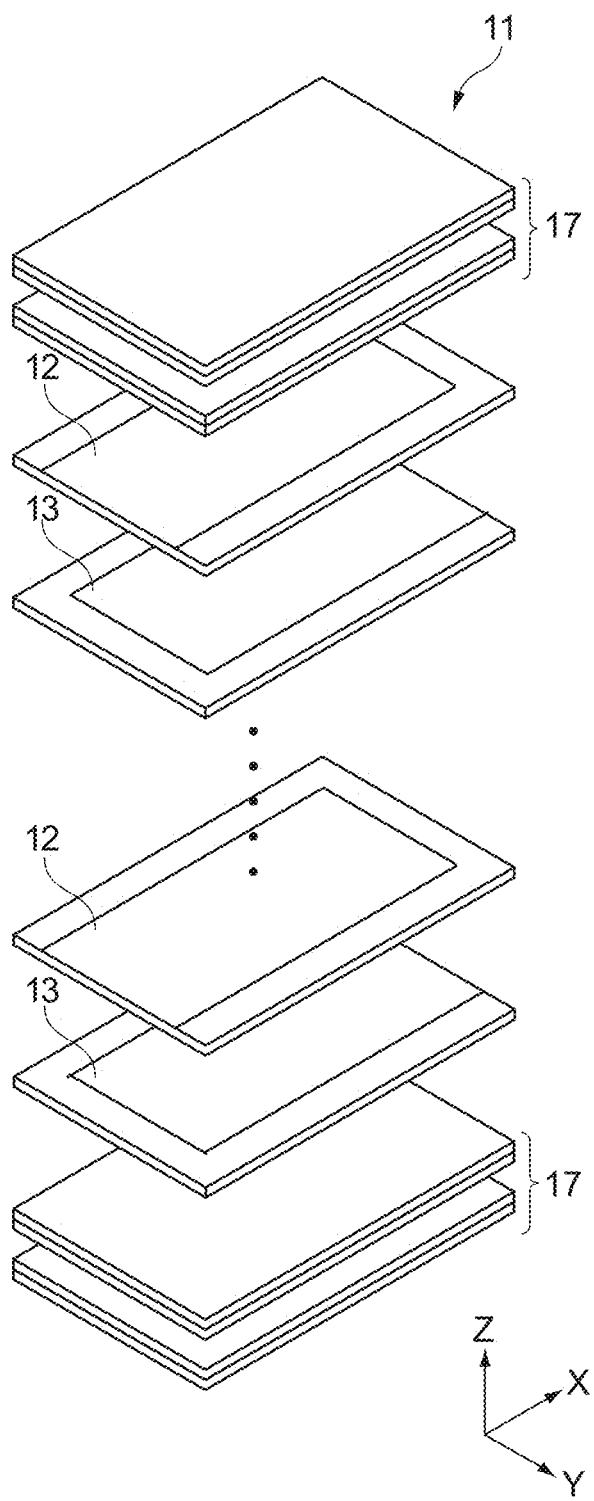
FIG. 4 is an exploded perspective view of a ceramic body of the multi-layer ceramic capacitor.

FIG. 4 is an exploded perspective view of the ceramic body 11. The ceramic body 11 has a structure in which sheets are laminated as shown in FIG. 4. The capacitance forming unit 16 and the side margins 18 can be formed of sheets on which the first internal electrodes 12 and the second internal electrodes 13 are printed. The covers 17 can be formed of sheets on which the first internal electrodes 12 and the second internal electrodes 13 are not printed.

As shown in FIG. 2, the first internal electrodes 12 are drawn to the end surface of the ceramic body 11 on the first external electrode 14 side and are connected to the first external electrode 14. The second internal electrodes 13 are drawn to the end surface of the ceramic body 11 on the second external electrode 15 side and are connected to the second external electrode 15. With this configuration, the first internal electrodes 12 and the second internal electrodes 13 are electrically continuous with the first external electrode 14 and the second external electrode 15, respectively.

Further, the first internal electrodes 12 are disposed with a gap between the first internal electrodes 12 and the second external electrode 15, and are insulated from the second external electrode 15. The second internal electrodes 13 are disposed with a gap between the second internal electrodes 13 and the first external electrode 14, and are insulated from the first external electrode 14. In other words, the first internal electrodes 12 are electrically continuous with only the first external electrode 14, and the second internal electrodes 13 are electrically continuous with only the second external electrode 15.

The first internal electrodes 12 and the second internal electrodes 13 are each formed of a good conductor of electricity and function as internal electrodes of the multi-layer ceramic capacitor 10. Examples of the good conductor of electricity forming the first and second internal electrodes 12 and 13 include a metal mainly containing nickel (Ni), copper (Cu), palladium (Pd), platinum (Pt), silver (Ag), gold (Au), or the like, and an alloy of those metals.

The capacitance forming unit 16 is formed of dielectric ceramics. In the multi-layer ceramic capacitor 10, in order to increase capacitances of respective dielectric ceramic layers provided between the first internal electrodes 12 and the second internal electrodes 13, dielectric ceramics having a high dielectric constant is used as a material forming the capacitance forming unit 16. Examples of the dielectric ceramics having a high dielectric constant include a material having a Perovskite structure containing barium (Ba) and titanium (Ti), which is typified by barium titanate ($BaTiO_3$).

Further, examples of the dielectric ceramics forming the capacitance forming unit 16 may include a strontium titanate ($SrTiO_3$) based material, a calcium titanate ($CaTiO_3$) based material, a magnesium titanate ($MgTiO_3$) based material, a calcium zirconate ($CaZrO_3$) based material, a calcium zirconate titanate ($Ca(Zr,Ti)O_3$) based material, a barium zirconate ($BaZrO_3$) based material, and a titanium oxide ($TiO_2$) based material, other than a barium titanate based material.

The covers 17 and the side margins 18 are also formed of dielectric ceramics. A material forming the covers 17 and the side margins 18 may be insulating ceramics, but if a material having a composition system similar to that of the capacitance forming unit 16 is used therefor, production efficiency is increased, and internal stress in the ceramic body 11 is suppressed.

With the configuration described above, when a voltage is applied between the first external electrode 14 and the second external electrode 15 in the multi-layer ceramic capacitor 10, the voltage is applied to the dielectric ceramic layers between the first internal electrodes 12 and the second internal electrodes 13 in the capacitance forming unit 16. With this configuration, the multi-layer ceramic capacitor 10 stores charge corresponding to the voltage applied between the first external electrode 14 and the second external electrode 15.

Note that the configuration of the multi-layer ceramic capacitor 10 is not limited to a specific configuration, and a well-known configuration can be employed as appropriate depending on the size and performance expected for the multi-layer ceramic capacitor 10. For example, the number of first internal electrodes 12, the number of second internal electrodes 13, and the thickness of each of the dielectric ceramic layers between the first internal electrodes 12 and the second internal electrodes 13 can be determined as appropriate.

2. Detailed Configuration of First and Second External Electrodes 14 and 15

Figure 5:
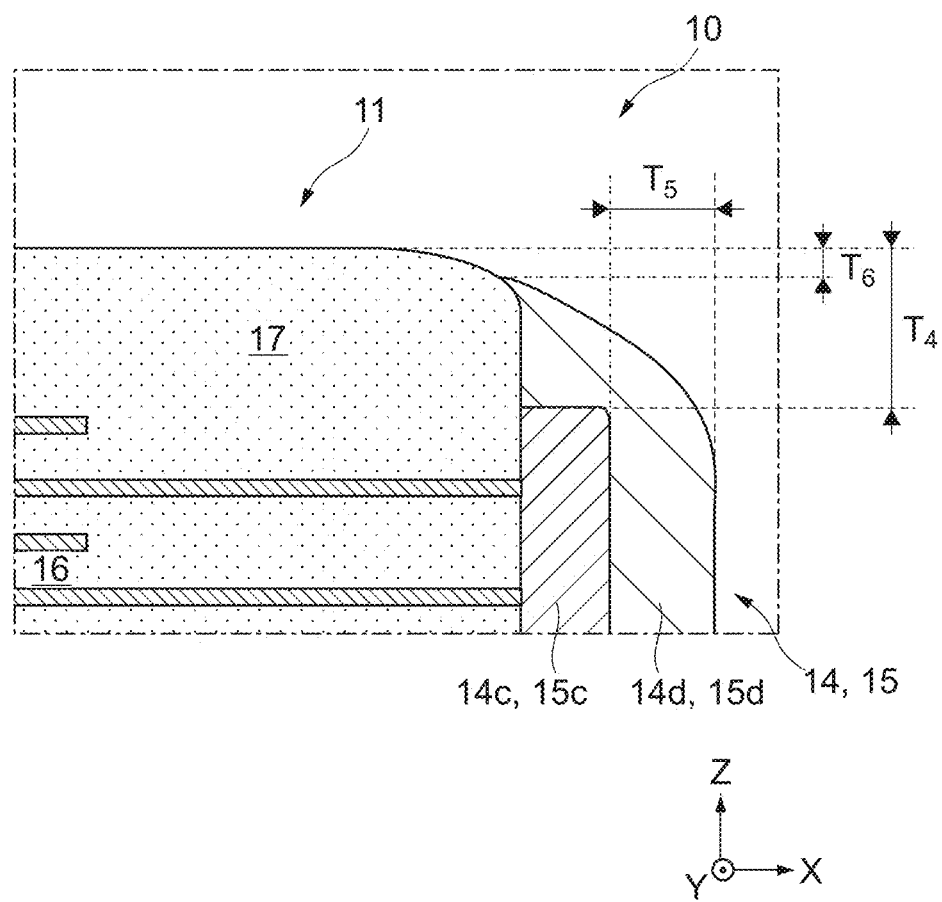
FIG. 5 is a partial cross-sectional view of the multi-layer ceramic capacitor of FIG. 2 shown in an enlarged manner.

FIG. 5 is a partial cross-sectional view of the multi-layer ceramic capacitor 10 of FIG. 2 shown in an enlarged manner. FIG. 5 shows the vicinity of the upper end of the second external electrode 15 in the Z-axis direction. Note that in the multi-layer ceramic capacitor 10, the first external electrode 14 has a configuration similar to that of the second external electrode 15. Thus, FIG. 5 also shows the reference symbols of the first external electrode 14, together with the reference symbols of the second external electrode 15.

In the multi-layer ceramic capacitor 10, the external electrode 14, 15 includes a sputtering film 14c, 15c formed by sputtering and a plating film 14d, 15d formed by electrolytic plating. The sputtering film 14c, 15c is formed as a base film. The plating film 14d, 15d may have a single-layer structure or a multi-layer structure.

The sputtering film 14c, 15c is provided to the end surface of the ceramic body 11. The plating film 14d, 15d covers the entire sputtering film 14c, 15c and comes around the sputtering film 14c, 15c. In the external electrode 14, 15, stress to be applied to the extended portion 14b, 15b is controllable depending on sputtering conditions for forming the sputtering film 14c, 15c.

The upper end of the sputtering film 14c, 15c in the Z-axis direction is favorably disposed with an interval of a dimension $T_4$ from the first main surface of the ceramic body 11 in the Z-axis direction. Accordingly, even if the plating film 14d, 15d comes around the upper side of the sputtering film 14c, 15c in the Z-axis direction, the external electrode 14, 15 is likely to be inhibited from protruding from the first main surface of the ceramic body 11 in the Z-axis direction.

In order to inhibit the external electrode 14, 15 from protruding from the first main surface of the ceramic body 11, the dimension $T_4$ between the sputtering film 14c, 15c and the first main surface of the ceramic body 11 is favorably larger than a thickness $T_5$, which is the dimension of the plating film 14d, 15d in the X-axis direction provided on the cover portion 14a, 15a of the external electrode 14, 15.

Further, in order to inhibit the external electrode 14, 15 from protruding from the first main surface of the ceramic body 11, the upper end of the plating film 14d, 15d in the Z-axis direction is also favorably disposed with an interval of a dimension $T_6$ from the first main surface of the ceramic body 11 in the Z-axis direction. The dimension $T_6$ is more favorably 5 μm or more.

Note that, in the external electrode 14, 15, it is favorable for the sputtering film 14c, 15c to reach the cover 17 in the Z-axis direction. With this configuration, all of the first and second internal electrodes 12 and 13 are connected together by the sputtering film 14c, 15c, and thus the first and second internal electrodes 12 and 13 and the first and second external electrodes 14 and 15 can be more reliably connected to each other.

3. Example

For the multi-layer ceramic capacitor 10, four types of samples were produced, which were identical to one another in the thickness ($T_1+T_2$) of 45 μm and different from one another in the ratio $T_2/(T_1+T_2)$ of the thickness $T_2$ of the extended portion 14b, 15b to the thickness ($T_1+T_2$). In each of the samples, the dimension in the X-axis direction was set to 1.0 mm, and the dimension in the Y-axis direction was set to 0.5 mm.

The ceramic body 11 of each sample was produced by sintering a chip. The chip was obtained by cutting the laminate of dielectric ceramic green sheets on which an electrical conductive paste for forming internal electrodes is printed as appropriate. A sintering temperature for the ceramic body 11 was set to 1,000 to 1,400° C.

For the multi-layer ceramic capacitor 10, after consideration of the amount of shrinking at the time of sintering of the ceramic body 11, the number of laminated green sheets each having the thickness of 0.5 to 3 μm was adjusted, thus producing five types of samples in which the thickness $T_1$ of the ceramic body 11 is 41 μm, 38 μm, 32 μm, 29 μm, and 25 μm.

The first external electrode 14 and the second external electrode 15 of each sample were formed by plating treatment performed on the base films deposited by sputtering. The thickness $T_2$ of the extended portion 14b, 15b of the external electrode 14, 15 of each sample was set to 4 μm, 7 μm, 13 μm, 16 μm, and 20 μm, through the adjustment of conditions for the plating treatment (current, time, and the like).

Figure 6:
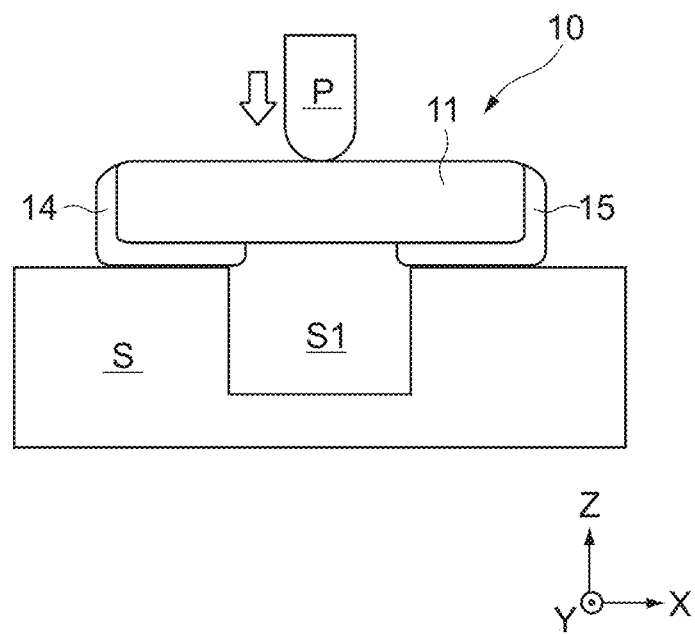
FIG. 6 is a schematic view for describing flexural strength measurement of multi-layer ceramic capacitors according to Example.

The flexural strength was measured for the samples of the multi-layer ceramic capacitor 10 that were obtained as described above. FIG. 6 is a schematic view for describing the flexural strength measurement. In the flexural strength measurement, a base S and a pusher P are used. The base S includes a recess S1 that is recessed downward in the Z-axis direction. The pusher P is disposed above the recess S1 of the base S in the Z-axis direction.

A dimension of the recess S1 of the base S in the X-axis direction is 0.6 times as large as the dimension of each sample in the longitudinal direction. Further, the lower end of the pusher P in the Z-axis direction is formed to have an arc-shaped cross section with a radius of 500 μm. Each sample is set on the base S so as to cross over the recess S1 in the longitudinal direction and such that the pusher P faces the center portion of the main surface of the ceramic body 11.

FIG. 6 shows a state where the sample of the multi-layer ceramic capacitor 10 is set on the base S. From this state, the pusher P is moved downward in the Z-axis direction, and stress is applied downward in the Z-axis direction to the upper surface of each sample in the Z-axis direction until mechanical damage occurs in each sample. In this period of time, a load applied to each sample from the pusher P was sequentially measured.

Figure 7:
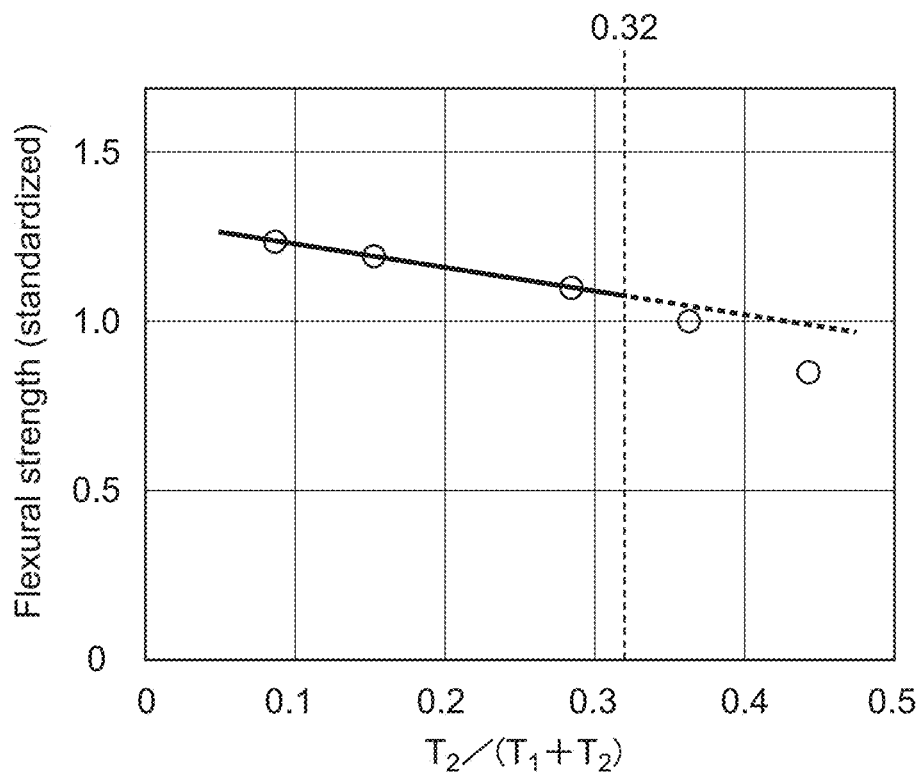
FIG. 7 is a graph showing results of the flexural strength measurement of the multi-layer ceramic capacitors according to Example.

A load generated when mechanical damage occurs in each sample was assumed as flexural strength of each sample. FIG. 7 is a graph showing results of the flexural strength measurement of the samples. The horizontal axis of FIG. 7 represents the ratio $T_2/(T_1+T_2)$ of the thickness $T_2$ of the extended portion 14b, 15b to the thickness $(T_1+T_2)$ in each sample, and the vertical axis of FIG. 7 represents a relative value obtained by standardizing the flexural strength of each sample.

With reference to FIG. 7, it is found that the flexural strength decreases as $T_2/(T_1+T_2)$ increases. More specifically, it is found that the flexural strength linearly decreases in the range of $0<T_2/(T_1+T_2)<0.32$, whereas the flexural strength sharply decreases when $T_2/(T_1+T_2)$ exceeds 0.32.

Accordingly, in the multi-layer ceramic capacitor 10, it was determined that when $T_2/(T_1+T_2)$ is set to 0.32 or less, high flexural strength tends to be obtained. Further, in the multi-layer ceramic capacitor 10, it was determined that when $T_2/(T_1+T_2)$ is 0.04 or more, high flexural strength is obtained.

4. Other Embodiments

While the embodiment of the present disclosure has been described, the present disclosure is not limited to the embodiment described above, and it should be appreciated that the present disclosure may be variously modified.

For example, in the multi-layer ceramic capacitor 10, the first external electrode 14 and the second external electrode 15 may be extended from the end surfaces of the ceramic body 11 to not only the main surface on the lower side in the Z-axis direction but also at least one of both the side surfaces facing in the Y-axis direction. In other words, the first external electrode 14 and the second external electrode 15 of the multi-layer ceramic capacitor 10 may have U-shaped or L-shaped cross sections along the X-Y plane.

Further, in the embodiment described above, the multi-layer ceramic capacitor 10 has been described as an example of a multi-layer ceramic electronic component, but the present disclosure can be applied to any other multi-layer ceramic electronic components each including a pair of external electrodes. Examples of such multi-layer ceramic electronic components include a chip varistor, a chip thermistor, and a multi-layer inductor.

What is claimed is:

1. A multi-layer ceramic electronic component, comprising:
a ceramic body including
a first main surface and a second main surface that face in a first axis direction,
a first end surface and a second end surface that face in a second axis direction orthogonal to the first axis direction,
a first internal electrode that is drawn to the first end surface, and
a second internal electrode that faces the first internal electrode and is drawn to the second end surface,
a length of the ceramic body measured in the second axis direction being longer than both a length of the ceramic body measured in the first axis direction and a length of the ceramic body measured in a third axis direction, the third axis direction being perpendicular to both the first axis direction and the second axis direction;
a first external electrode including
a first cover portion that covers the first end surface, and
a first extended portion that extends from the first cover portion to the second main surface; and
a second external electrode including
a second cover portion that covers the second end surface, and
a second extended portion that extends from the second cover portion to the second main surface,
the multi-layer ceramic electronic component satisfying that, when $T_1$ represents a dimension of the ceramic body in the first axis direction, and when $T_2$ represents a dimension of each of the first extended portion and the second extended portion in the first axis direction, $T_2/(T_1+T_2)$ is 0.32 or less,
wherein both the first external electrode and the second external electrode are absent from the first main surface.

2. The multi-layer ceramic electronic component according to claim 1, wherein
a dimension of each of the first extended portion and the second extended portion in the second axis direction is equal to or larger than 25% of a dimension of the ceramic body in the second axis direction.

3. The multi-layer ceramic electronic component according to claim 1, wherein
each of the first external electrode and the second external electrode includes a sputtering film.

4. The multi-layer ceramic electronic component according to claim 1, wherein
$T_2/(T_1+T_2)$ is 0.04 or more.

5. The multi-layer ceramic electronic component according to claim 1, wherein
$T_2$ is 2 μm or more.

6. The multi-layer ceramic electronic component according to claim 3, wherein
each of the first external electrode and the second external electrode includes a plating film, and
a dimension $T_4$ between the sputtering film and the first main surface of the ceramic body is larger than a thickness $T_5$, which is a dimension of the plating film in the second axis direction provided on the first cover portion and the second cover portion.

7. The multi-layer ceramic electronic component according to claim 1, wherein each of the first external electrode and the second external electrode includes a plating film,
an upper end of the plating film in the first axis direction is disposed with an interval of a dimension $T_6$ from the first main surface in the first axis direction, and
the dimension $T_6$ is 5 μm or more.

\* \* \* \* \*